(12) United States Patent
Menochet

(10) Patent No.: US 10,131,093 B2
(45) Date of Patent: Nov. 20, 2018

(54) WELDED STRUCTURAL JOINT BETWEEN A HIGH-PERFORMANCE THERMOPLASTIC MATRIX COMPOSITE MATERIAL AND AN ELASTOMER

(71) Applicant: AIRBUS DEFENCE AND SPACE SAS, Les Mureaux (FR)

(72) Inventor: Audrey Menochet, Le Bouscat (FR)

(73) Assignee: ARIANEGROUP SAS, Paris (FR)

( * ) Notice: Subject to any disclaimer, the term of this patent is extended or adjusted under 35 U.S.C. 154(b) by 394 days.

(21) Appl. No.: 14/781,577

(22) PCT Filed: Apr. 1, 2014

(86) PCT No.: PCT/EP2014/056493
§ 371 (c)(1),
(2) Date: Sep. 30, 2015

(87) PCT Pub. No.: WO2014/161833
PCT Pub. Date: Oct. 9, 2014

(65) Prior Publication Data
US 2016/0059478 A1    Mar. 3, 2016

(30) Foreign Application Priority Data
Apr. 3, 2013 (FR) ..................................... 13 52984

(51) Int. Cl.
*B29C 65/00* (2006.01)
*B29C 65/34* (2006.01)
(Continued)

(52) U.S. Cl.
CPC ............ *B29C 66/712* (2013.01); *B29C 65/20* (2013.01); *B29C 65/344* (2013.01);
(Continued)

(58) Field of Classification Search
CPC ............... B29C 66/712; B29C 66/1122; B29C 66/3034; B29C 66/45; B29C 66/71;
(Continued)

(56) References Cited

U.S. PATENT DOCUMENTS 1,875,552 A *  9/1932  Bateman ............... B29C 33/722
                                                    134/40
4,744,851 A *  5/1988  Lorenz .................... B29C 33/68
                                                    156/247

(Continued)

FOREIGN PATENT DOCUMENTS

DE       27 46 544 A1     4/1979
DE       2746544 A1 *     4/1979  ......... B29C 37/0082
(Continued)

OTHER PUBLICATIONS

Machine Translation of DE-2746544-A1 (Year: 1979).*
(Continued)

*Primary Examiner* — Daniel McNally
(74) *Attorney, Agent, or Firm* — Im IP Law; C. Andrew Im

(57) ABSTRACT

A method for producing, by welding, a joint between a thermoplastic matrix composite material and an elastomeric material. The elastomeric material is functionalized by incorporating, onto the surface of the elastomer, a nonwoven fabric consisting of fibers of thermoplastic material. The functionalized surface of the elastomeric material is welded to the thermoplastic material of the composite. The functionalization of the elastomeric material is performed during the vulcanization of the raw elastomer. The vulcanization is performed under a sufficient pressure for the nonwoven fabric placed on the surface of the raw elastomer to become incorporated with same, at least at the surface, during the vulcanization process. The welding operation includes interposing a metal fabric coated with thermoplastic material (Continued)

between the surfaces of the elastomer and the composite that are welded to each other, and passing an electric current through same, resulting in the surface melting of the two materials.

32 Claims, 2 Drawing Sheets

(51) Int. Cl.
| | |
|---|---|
| B29C 65/48 | (2006.01) |
| B29C 65/50 | (2006.01) |
| B32B 5/02 | (2006.01) |
| B32B 27/08 | (2006.01) |
| B32B 27/12 | (2006.01) |
| B32B 27/32 | (2006.01) |
| C08J 5/12 | (2006.01) |
| B29C 65/20 | (2006.01) |
| B29C 65/36 | (2006.01) |
| B29L 31/30 | (2006.01) |
| B29C 65/02 | (2006.01) |
| B29C 35/02 | (2006.01) |
| B29K 71/00 | (2006.01) |
| B29L 7/00 | (2006.01) |
| B29L 9/00 | (2006.01) |

(52) U.S. Cl.
CPC .......... *B29C 65/348* (2013.01); *B29C 65/364* (2013.01); *B29C 65/4815* (2013.01); *B29C 65/5021* (2013.01); *B29C 65/5028* (2013.01); *B29C 65/5057* (2013.01); *B29C 66/1122* (2013.01); *B29C 66/3034* (2013.01); *B29C 66/45* (2013.01); *B29C 66/71* (2013.01); *B29C 66/721* (2013.01); *B29C 66/7212* (2013.01); *B29C 66/7392* (2013.01); *B29C 66/73755* (2013.01); *B29C 66/742* (2013.01); *B29C 66/7465* (2013.01); *B29C 66/81455* (2013.01); *B32B 5/022* (2013.01); *B32B 27/08* (2013.01); *B32B 27/12* (2013.01); *B32B 27/322* (2013.01); *C08J 5/12* (2013.01); *B29C 35/02* (2013.01); *B29C 65/02* (2013.01); *B29C 66/02* (2013.01); *B29C 66/02245* (2013.01); *B29C 66/7294* (2013.01); *B29C 66/73751* (2013.01); *B29C 66/919* (2013.01); *B29C 66/91443* (2013.01); *B29C 66/91645* (2013.01); *B29C 66/91655* (2013.01); *B29C 66/949* (2013.01); *B29C 2035/0211* (2013.01); *B29K 2071/00* (2013.01); *B29K 2995/0005* (2013.01); *B29K 2995/0046* (2013.01); *B29K 2995/0087* (2013.01); *B29L 2007/008* (2013.01); *B29L 2009/00* (2013.01); *B29L 2031/3097* (2013.01); *B32B 2260/021* (2013.01); *B32B 2260/046* (2013.01); *B32B 2307/304* (2013.01)

(58) Field of Classification Search
CPC ............. B29C 66/721; B29C 66/7212; B29C 66/73755; B29C 66/7392; B29C 66/742; B29C 66/7465; B29C 66/81455; B29C 65/20; B29C 65/344; B29C 65/348; B29C 65/364; B29C 65/4815; B29C 65/5021; B29C 65/5028; B29C 65/5057
See application file for complete search history.

(56) References Cited

U.S. PATENT DOCUMENTS

| | | | |
|---|---|---|---|
| 4,931,178 A | 6/1990 | Manniso et al. | |
| 5,122,420 A * | 6/1992 | Baron | B32B 25/08 428/474.4 |
| 6,461,455 B1 * | 10/2002 | Meatto | B29C 35/0272 156/273.7 |
| 2002/0038687 A1* | 4/2002 | Anderson | B29C 65/5042 156/275.7 |
| 2010/0310873 A1* | 12/2010 | Sullivan | B29C 73/02 428/411.1 |

FOREIGN PATENT DOCUMENTS

| | | | | |
|---|---|---|---|---|
| GB | 481 327 A | | 3/1938 | |
| GB | 820 339 A | | 9/1959 | |
| GB | 2 207 087 A | | 1/1989 | |
| GB | 2207087 A | * | 1/1989 | ............ B01D 25/001 |
| JP | S61 68229 A | | 4/1986 | |
| JP | 2011073157 A | * | 4/2011 | |
| WO | WO-2012051479 A1 | * | 4/2012 | ............. D04H 1/435 |

OTHER PUBLICATIONS

Machine Translation of JP-2011073157-A (Year: 2011).*
Michael J. Troughton, "Handbook of Plastics Joining," 2008, Second Edition, William Andrew Inc. Norwich, New York.

* cited by examiner

WELDED STRUCTURAL JOINT BETWEEN A HIGH-PERFORMANCE THERMOPLASTIC MATRIX COMPOSITE MATERIAL AND AN ELASTOMER

RELATED APPLICATIONS

This application is a § 371 application from PCT/EP2014/056493 filed Apr. 1, 2014, which claims priority from French Patent Application No. 13 52984 filed Apr. 3, 2013, each of which is herein incorporated by reference in its entirety.

FIELD OF THE INVENTION

The invention relates to the field of structural chemical assemblies from dissimilar materials, and more precisely assembly of elastomeric materials with thermoplastic materials. Speaking quite generally, the term thermoplastic material is used here to describe any material comprising a certain percentage of thermoplastic material constituting a matrix, whether it is a material consisting solely of thermoplastic material or for example a composite material with continuous fibers and a thermoplastic matrix.

The invention finds particular application, for example, in the context of the fabrication of propulsion stages of powder rockets, for joining the tank to the skirts.

BACKGROUND OF THE INVENTION

Assembly of two high-performance thermoplastic matrix composites by welding generally involves the use of known assembly techniques. Moreover, in order to heat the assembly zone to the desired temperature, it is possible to employ several known principles of heating such as heating by hot gas (stove, autoclave), by vibration (ultrasound, rotation), by induction, by resistance, etc. This type of assembly is notably described in the book by Michael J. Troughton with the title "Handbook of plastics joining" (Plastics Design Library). ISBN: 978-1-884207-17-4.

Conversely, to date, there is no known means for assembly of a thermoplastic matrix composite and a material of the elastomer type by welding. This absence seems to have its origin in the fact that since the elastomers do not have the property of passing reversibly from the solid state to the molten state, an assembly technique requiring heating of the materials to be assembled, at least at the level of the assembly zone, does not seem obvious to a person skilled in the art.

For certain applications, the known assembly techniques, allowing assembly of an element made of thermoplastic material with an element made of polymer material, do not give the required qualities, notably in terms of mechanical durability.

This is the case for example, as illustrated schematically in FIG. 1, for assembly of a shroud 11 (of metallic material or composite with thermoplastic or thermosetting matrix) on a tank 12 of thermoplastic matrix composite to constitute a propulsion stage of a powder launch vehicle, or a consumer gas tank.

In fact this assembly requires the insertion of a layer 13 of elastomeric material within the joint, said layer of elastomeric material having the role of absorbing the large differential strains that develop between the two structures. Therefore insertion of this interposed layer 13 of elastomeric material requires assembling this layer on the two elements of composite material that constitute the tank 12 and the shroud 11, and said assembly must necessarily be of high mechanical quality, owing to the stresses imposed on the assembly.

Now, in terms of mechanical durability, a welded joint is generally superior to a glued joint. In fact, after welding, there is no longer a differentiated interface between the two assembled parts, owing to diffusion of molecules from one part to the other, whereas in the case of a glued joint, there are as many interfaces as there are layers required for creating the joint, said layers mainly including, besides the layer of adhesive proper, the adhesion primers, as well as the treatments applied on the surfaces to be assembled.

Moreover, in the case of welding, we also no longer have the constraints due to preparation of the surfaces before assembly and protection of them against contaminants, these operations being necessary, or even imperative, in the case of assembly by gluing.

OBJECT AND SUMMARY OF THE INVENTION

One aim of the invention is to propose a solution for performing structural assembly by welding of a thermoplastic material and an elastomeric material, attention being focused on these two classes of materials.

Accordingly, the invention relates to a method for making a welded structural joint between a thermoplastic matrix composite and an elastomer, characterized in that said method comprises the following operations:

a first operation of functionalization of the elastomeric material by means of a nonwoven textile formed from thermoplastic material fibers, functionalization being carried out by penetration of the textile into the surface layer of the elastomeric material during the operation of vulcanization of said elastomeric material under pressure;

a second operation of welding proper, during which the thermoplastic composite material is welded to the functionalized layer of elastomeric material.

According to various particular arrangements, which may be considered jointly, the method according to the invention may in addition have the following features.

According to a particular arrangement, the operation for producing the functionalized elastomer itself comprises several steps:

a first step of cleaning the various parts of the vulcanizing mold used;

a second step during which the nonwoven textile is applied on the surface of the elastomeric material;

a third step during which vulcanization of the elastomeric material under pressure is carried out; the pressure applied being such that the nonwoven textile placed at the surface of the elastomer becomes incorporated therein, at least at the surface, during the vulcanizing process.

According to another particular arrangement, the nonwoven textile is produced by carrying out the following operations:

carding of thermoplastic material monofilaments;

producing webs that are superposed on one another and held together by needlepunching;

reinforcing the textile by hydroentangling.

According to another particular arrangement, the nonwoven textile is made from a thermoplastic material selected so that it is both able to be welded to the thermoplastic material forming the matrix of the composite material and to display good compatibility with the elastomeric material.

According to a variant of this particular arrangement, the nonwoven textile is made from a thermoplastic material identical to that forming the matrix of the composite material.

According to another particular arrangement, the composite material being a carbon/polyetheretherketone composite and the elastomeric material being of the HNBR type, the nonwoven textile used is formed from polyetherimide fibers.

According to another particular arrangement, the second welding operation consists in heating the faying surfaces of the two materials to be welded by interposing, between these two surfaces, a woven metal wire cloth which performs the function of heating resistance, the woven metal wire cloth itself being impregnated with thermoplastic material.

According to another particular arrangement, the welding operation is preceded by a preliminary operation of preparation of the surfaces of the materials to be assembled, and said operation may, depending on the state of these surfaces, consist either of a simple degreasing using a suitable solvent, or fine grinding of the functionalized surface of the element made of elastomer, followed by cleaning the surfaces with the same solvent.

According to another particular arrangement, the composite material being a carbon/polyetheretherketone composite and the elastomeric material being of the HNBR type, the operation of functionalization of the elastomeric material comprises the following operations:

a) a first operation of placing the following elements on the bottom plate of the vulcanizing mold:
  two superposed layers of Teflon-coated glass cloth;
  a sheet of nonwoven textile composed of polyetherimide fibres;
  the sheets of unvulcanized raw elastomeric material;
  a set of edging blocks;
  two superposed layers of Teflon-coated glass cloth;
  the whole being covered with the top plate of the vulcanizing mold;
b) a second operation of placing the stack prepared on the plate of a heating press preheated to a temperature $\theta_2$ of 140° C.;
c) a third operation of hot pressing of the stack, during which the nominal pressing cycle appropriate to the elastomer in question is applied;
d) a fourth operation during which the mold is removed from the press while the latter maintains the temperature $\theta_2$ of 140° C., the functionalized elastomer is removed from the mold and is left to cool to room temperature.

According to a variant of this particular arrangement, the pressing cycle in the third operation comprises:
  a phase of gradual increase in temperature up to a high temperature $\theta_1$ of 230° C. at a gradient of 2.5° C./min,
  a phase of holding at the temperature $\theta_1$ for 10 minutes,
  a phase of temperature decrease to the temperature $\theta_2$ of 140° C. at a gradient of 2.5° C./min.

According to another particular arrangement, the composite material being a carbon/polyetheretherketone composite and the elastomeric material being of the HNBR type, the operation of welding proper II) comprises the following steps:

a) A first step of setting up, during which mainly the following elements are arranged, in the order shown, on
  a plate of heat-insulating material:
  a first film of heat-resistant polyimide,
  the functionalized elastomeric material,
  a first film of polyetherimide,
  a woven metal wire cloth preimpregnated with polyetherimide,
  a second film of polyetherimide,
  the thermoplastic composite material,
  a second polyimide film,
  a layer of heat-insulating material,
  glass cloth;
b) A second step during which a bladder is produced under vacuum with a polyimide film arranged so as to allow the woven metal wire cloth to stand out, hermeticity of said bladder being ensured by means of high-temperature mastic.
c) A third step during which the bladder is placed under vacuum, an electric power supply unit is connected to the woven metal wire cloth and different values of current are applied according to an appropriate cycle.
d) A fourth step during which the polyimide film serving as vacuum enclosure is removed and the stack is dismounted.

According to another particular arrangement, during the third step, a current of 15.6 A is applied to the woven metal wire cloth for 200 seconds and then a current of 10 A for 100 seconds.

BRIEF DESCRIPTION OF THE DRAWINGS

The features and advantages of the invention will be better understood from the description that follows, which is based on the appended figures, in which.

DETAILED DESCRIPTION OF THE EMBODIMENTS

The principle of the method according to the invention consists mainly of carrying out an operation of preparation of the elastomeric material, before welding proper. This operation consists of functionalizing, i.e. of modifying the surface, or the actual core, of the elastomer in order to endow it with the necessary properties so that it can be welded to the thermoplastic material. "Functionalizing the elastomeric material" means therefore "modifying" the composition of the surface layers of this elastomeric material by incorporating a thermoplastic material therein.

For this purpose, a nonwoven textile formed from fibres of a thermoplastic material having both compatibility with the elastomeric material and being weldable to the matrix of the thermoplastic composite material to which we wish to assemble the elastomeric material in question, is introduced into the elastomeric material, or at least at its surface.

Compatibility between the elastomeric material and the thermoplastic material forming the nonwoven textile mainly means, in this case, physicochemical compatibility between the two materials. This compatibility is reflected in possible interaction between the thermoplastic material of the nonwoven textile and the elastomer, an interaction that a person skilled in the chemistry of plastics is able to characterize by specific criteria, which are rather of a chemical nature: wettability, mutual diffusion between the materials, chemical bonds.

However, we are also interested in compatibility of application between the different materials (physical compatibility), notably regarding the need to be able to hot-vulcanize the elastomer but without causing degradation of the thermoplastic material forming the incorporated textile.

The operation of producing the functionalized elastomer comprises several steps:
  a first step of cleaning the various parts of the vulcanizing mold, said cleaning being carried out for example with methyl ethyl ketone (or MEK).
  a second step during which the nonwoven textile is applied on the surface of the raw (i.e. not yet vulcanized) elastomeric material and vulcanization of the elastomeric material under pressure is carried out. According to the invention, the pressure applied is determined such that the nonwoven textile placed at the surface of the elastomer becomes incorporated therein, at least at the surface, during the vulcanizing process.

Figure 1:
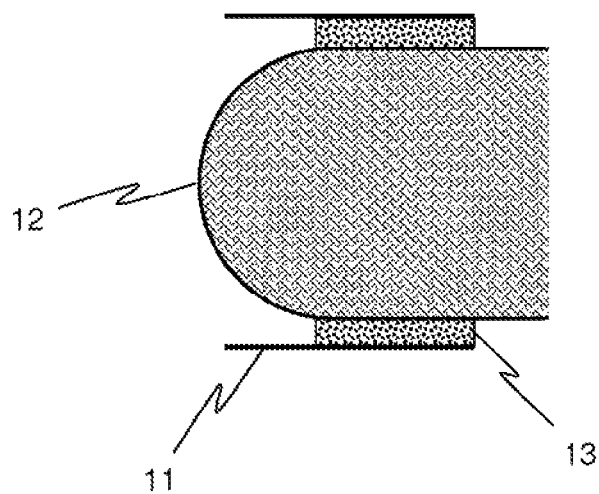
FIG. 1 is a schematic illustration of an example of a structure for which assembly of the different elements by welding seems particularly suitable, in view of the mechanical stresses imposed on said assembly.
Figure 2:
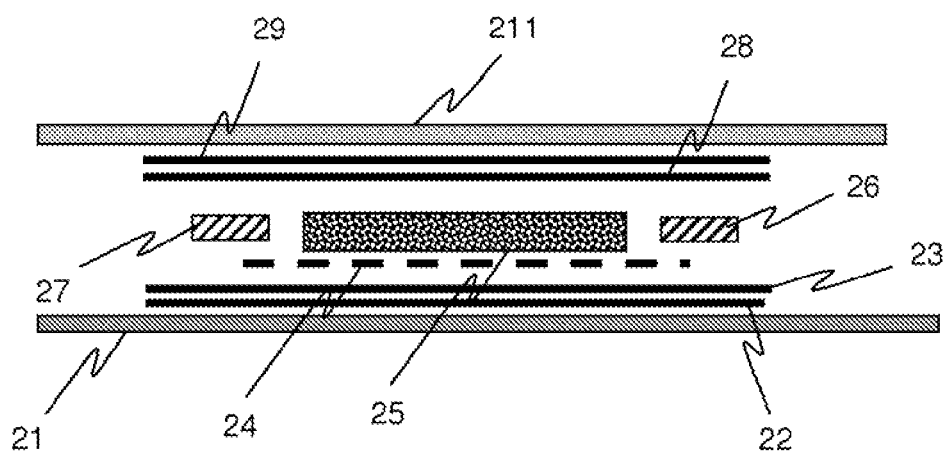
FIG. 2 is an illustration of an embodiment example of the elastomer functionalization step of the method according to the invention.

Thus, for example, in a particular embodiment of the invention, more particularly suitable for welding a composite material with a matrix of polyetheretherketone (PEEK) and with carbon fiber reinforcement (carbon/PEEK thermoplastic composite) to an elastomer of the type of hydrogenated nitrile rubbers (hydrogenated butadiene-acrylonitrile), or Buna or else HNBR (hydrogenated nitrile butadiene rubber), the production proper of the functionalized elastomer may itself comprise the following operations:

a) A first operation of setting up, on the bottom plate 21 of the vulcanizing mold, the elements necessary for carrying out functionalization of the elastomeric material, namely in the following order, and as illustrated in FIG. 2:
  two superposed layers 22 and 23 of Teflon-coated glass cloth, whose role consists of allowing mold release of the elastomer after polymerization;
  a sheet of nonwoven textile 24 composed of polyetherimide (or PEI) fibers,
  the sheets of raw elastomeric material 25 (unvulcanized), to be functionalized,
  a set of edging blocks 26, 27, blocks of type 304L stainless steel for example,
  two superposed layers 28 and 29 of Teflon-coated glass cloth, performing a role similar to that provided by layers 22 and 23.

After setting up, the whole is covered with the top plate 211 of the vulcanizing mold so that all the elements listed above are positioned between the bottom plate 21 and the top plate 211 of the mold;

b) a second operation of placing the stack prepared on the plate of a heating press preheated to a temperature $\theta_2$ of 140° C.;

c) a third operation of hot pressing of the stack, during which the nominal pressing cycle appropriate to the elastomer in question is applied, said cycle comprising:
  a phase of gradual increase in temperature up to a high temperature $\theta_1$ (230° C. at 2.5° C./min),
  a phase of holding at the temperature $\theta_1$ (230° C. plateau for 10 minutes),
  a phase of temperature decrease to the temperature $\theta_2$ (140° C. at 2.5° C./min);

d) a fourth operation during which the mold is removed from the press while the latter maintains the temperature $\theta_2$ (140° C.), the functionalized elastomer is removed from the mold and is left to cool to room temperature.

A surface-functionalized vulcanized elastomer is thus obtained, comprising a conventional elastomer base having a surface layer of elastomer functionalized by the layer of nonwoven textile 24 formed from thermoplastic material fibers, a layer having a thickness of 0.4 mm for example.

It should be noted that, according to the invention, the nonwoven textile used here consists, preferably, of short fibers of thermoplastic material, of PEI for example, entangled and distributed in a random orientation. The method for manufacturing this nonwoven textile mainly comprises the following operations:
  carding of thermoplastic material monofilaments;
  producing webs that are superposed on one another and held together by needlepunching;
  reinforcing the textile by hydroentangling.

In a particular embodiment, the nonwoven textile is selected to be the same material as that which constitutes the matrix of the composite material to which the elastomeric material is to be welded, a textile having a density of 100 g/m², needlepunched and hydroentangled under a pressure of 40 bar for example.

However, it should be noted that this nonwoven textile may be produced from a different material, notably to better satisfy the dual requirement of good adhesion of the two thermoplastic materials (i.e. that of the composite material and that of the textile for functionalization of the elastomer) and of good compatibility of the material constituting the textile for functionalization and of the elastomeric material.

Once the polymer material is functionalized, the method according to the invention continues with the welding step proper, an operation which, owing to the functionalization of the polymer material, takes place advantageously similarly to an operation of welding of two parts made of thermoplastic matrix composite. This operation may notably be carried out by induction or by resistance.

It should be noted that, advantageously, the welding operation is not subject to any constraint of delay in being carried out, in contrast to what may happen in the case of assembly by gluing. Since the functionalized elastomeric material is vulcanized before assembly, welding of the two materials may thus be carried out at the time that is considered to be the most suitable, which may be a varying length of time after completion of functionalization.

The resistance method consists of local heating of the interface between the composite material and the functionalized elastomer, to obtain a bond between the thermoplastic matrix of composite material and the thermoplastic part of the functionalized elastomer.

According to the invention, the welding step proper begins with a preliminary operation of preparation of the surfaces to be assembled. Depending on the state of these surfaces, preparation may consist of simple degreasing using a suitable solvent, ethanol for example, or fine grinding of the functionalized surface of the element made of elastomer, with SiC paper abrasive of 400 grain for example, followed by cleaning the surfaces and in particular the ground surface, using the same solvent. Here, "suitable solvent" means a solvent of fats, which by its nature or its composition does not present any risk of causing dissolution of the material itself.

There then follows an operation consisting of heating the faying surfaces of the two materials to be welded by interposing, between these two surfaces, a woven metal wire cloth, which performs the function of heating resistance; said operation being carried out under vacuum.

According to the invention, the woven metal wire cloth is itself impregnated with thermoplastic material.

Figure 3:
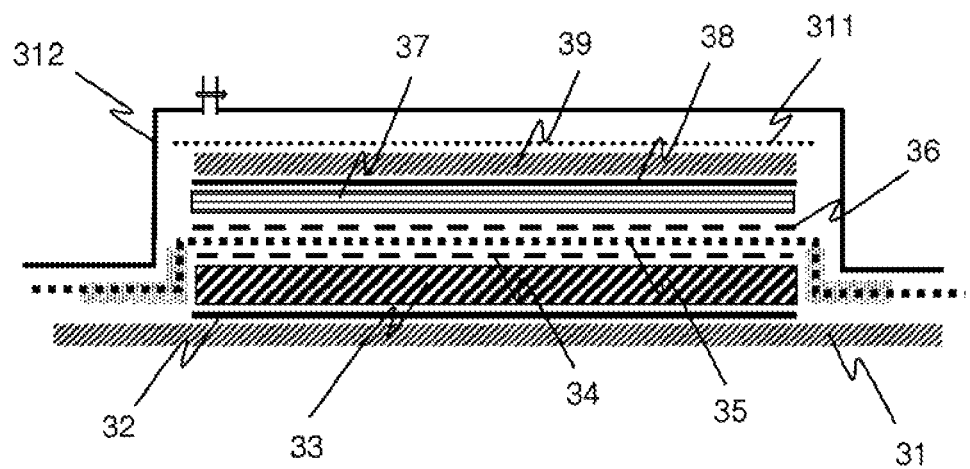
FIG. 3 is an illustration of an embodiment example of the welding operation according to the invention.

Thus, for example, in a particular embodiment of the invention, more particularly suitable for welding a composite material with a PEEK matrix and with carbon fiber reinforcement (carbon/PEEK thermoplastic composite) to an elastomer of the HNBR type (Buna), the operation of welding proper may itself comprise the following steps:

a) A first step of setting up, during which, as illustrated in FIG. 3, mainly the following elements are arranged, in the order shown, on a plate 31 of heat-insulating material, NL FIH for example:
- a first film 32 of heat-resistant polyimide, preferably a film of Upilex®, intended to promote disassembly of the assembly after welding,
- the functionalized elastomeric material 33,
- a first film 34 of polyetherimide (PEI), of the type Ultem® 1000 for example,
- a woven metal wire cloth 35 preimpregnated with PEI, for example a cloth of reference 102083 manufactured by the company Gantois,
- a second film 36 of polyetherimide (PEI),
- the thermoplastic composite material 36 (C/PEEK) coated with PEI,
- a second film 37 of polyimide Upilex also intended to promote disassembly of the assembly after welding,
- a layer of heat-insulating material 38 (NL FIH),
- glass cloth 311, of the type E5555 for example, intended to promote drainage of the air present.

b) A second step during which a bladder is produced under vacuum with a film 312 of polyimide (Thermalimide) arranged so as to allow the woven metal wire cloth impregnated with PEI to stand out; hermeticity being obtained with a high-temperature mastic A800 3G.

c) A third step during which the bladder 312 thus produced is placed under vacuum, an electric power supply unit is connected to the woven metal wire cloth 35 and different values of current are applied according to an appropriate cycle: for example 15.6 A for 200 seconds and then 10 A for 100 seconds.

d) A fourth step during which the polyimide film 312 serving as vacuum enclosure is removed and the stack is dismounted, so as to recover the elastomer-thermoplastic composite assembly thus produced.

The invention claimed is:

1. A method for producing a welded structural joint between a thermoplastic matrix of a composite material and an elastomer, comprising the steps of:
   functionalizing an elastomeric material using a nonwoven textile formed from thermoplastic material fibers configured to be welded with the thermoplastic matrix of said composite material, functionalization is carried out by penetration of the non-woven textile into a surface layer of the elastomeric material during vulcanization of the elastomeric material under pressure to provide a functionalized layer of the elastomeric material; and
   welding the thermoplastic matrix of said composite material to the functionalized layer of the elastomeric material.

2. The method as claimed in claim 1, wherein the step of welding comprises the steps of heating faying surfaces of two materials to be welded by interposing a woven metal wire cloth between the faying surfaces of the two materials, the woven metal wire cloth functions as a heating resistance and the woven metal wire cloth is impregnated with a thermoplastic material.

3. The method as claimed in claim 2, further comprising the step of preparing the faying surfaces of the two materials to be assembled prior to the step of welding.

4. The method of claim 3, wherein the step of preparing comprises the steps of degreasing using a solvent, and cleaning the faying surfaces of the two materials with the solvent.

5. The method of claim 3, wherein the step of preparing comprises the steps of grinding a surface of the functionalized layer of the elastomeric material forming the elastomer, and cleaning the surface of the functionalized layer with a solvent.

6. The method as claimed in claim 1, further comprising the step of producing the nonwoven textile from a thermoplastic material that is both weldable to a thermoplastic material forming said composite material and compatible with the elastomeric material.

7. The method as claimed in claim 6, further comprising the step of producing the nonwoven textile from a thermoplastic material identical to the thermoplastic material forming said composite material.

8. The method as claimed in claim 1, wherein the step of functionalizing comprises the steps of:
   cleaning various parts of a vulcanizing mold;
   applying the nonwoven textile on a surface of the elastomeric material; and
   vulcanizing the elastomeric material under a pressure so that the nonwoven textile placed at a surface of the elastomer material becomes incorporated therein, at least at the surface, during the vulcanization process.

9. The method as claimed in claim 1, further comprising the steps of producing the nonwoven textile by:
   carding thermoplastic material monofilaments;
   producing webs superposed on one another and held together by needle-punching; and
   reinforcing the nonwoven textile by hydro-entangling.

10. A method for producing a welded structural joint between a thermoplastic matrix of a composite material and an elastomer, comprising the steps of:
    functionalizing an elastomeric material using a nonwoven textile formed from thermoplastic material fibers configured to be welded with the thermoplastic matrix of said composite material, functionalization is carried out by penetration of the non-woven textile into a surface layer of the elastomeric material during vulcanization of the elastomeric material under pressure to provide a functionalized layer of the elastomeric material;
    welding the thermoplastic matrix of said composite material to the functionalized layer of the elastomeric material; and
    wherein said composite material is a carbon/polyetheretherketone composite; wherein the elastomeric material is of a hydrogenated nitrile butadiene rubber type; and wherein the nonwoven textile is formed from polyetherimide fibers.

11. The method as claimed in claim 10, wherein the step of welding comprises the steps of heating faying surfaces of two materials to be welded by interposing a woven metal wire cloth between the faying surfaces of the two materials, the woven metal wire cloth functions as a heating resistance and the woven metal wire cloth is impregnated with a thermoplastic material.

12. The method as claimed in claim 11, further comprising the step of preparing the faying surfaces of the two materials to be assembled prior to the step of welding.

13. The method of claim 12, wherein the step of preparing comprises the steps of degreasing using a solvent, and cleaning the faying surfaces of the two materials with the solvent.

14. The method of claim 12, wherein the step of preparing comprises the steps of grinding a surface of the functionalized layer of the elastomeric material forming the elastomer, and cleaning the surface of the functionalized layer with a solvent.

15. The method as claimed in claim 10, wherein the step of functionalizing the elastomeric material comprises the steps of:
    setting up following elements on a bottom plate of a vulcanizing mold and covering the elements with a top plate of the vulcanizing mold to provide a stack:
        a first set of two superposed layers of Teflon-coated glass cloth;
        a sheet of nonwoven textile composed of polyetherimide fibers;
        sheets of unvulcanized raw elastomeric material;
        a set of edging blocks; and
        a second set of two superposed layers of Teflon-coated glass cloth; and
    placing the stack on plate of a heating press preheated to a temperature $\theta_2$ of 140° C.;
    hot pressing the stack by applying a nominal pressing cycle of the elastomer in question is applied;
    removing the vulcanizing mold from the heating press which maintains the temperature $\theta_2$ of 140° C.; and
    removing the functionalized layer of elastomeric material from the vulcanizing mold to cool to a room temperature.

16. The method as claimed in claim 15, wherein the nominal pressing cycle comprises:
    a phase of gradual increase in temperature to a high temperature $\theta_1$ of 230° C. at a gradient of 2.5° C./min;
    a phase of maintaining the temperature $\theta_1$ for 10 minutes; and
    a phase of temperature decrease to the temperature $\theta_2$ of 140° C. at a gradient of 2.5° C./min.

17. The method as claimed in claim 10, wherein the step of welding comprises the steps of:
    setting up and arranging the following elements in order on a plate of heat-insulating material to provide a stack:
        a first film of heat-resistant polyimide;
        the functionalized layer of elastomeric material;
        a first film of polyetherimide;
        a woven metal wire cloth pre-impregnated with polyetherimide;
        a second film of polyetherimide;
        the thermoplastic composite material;
        a second film of heat-resistant polyimide;
        a layer of heat-insulating material; and
        a glass cloth;
    producing a bladder under a vacuum with a third film of heat-resistant polyimide arranged to allow the woven metal wire cloth to stand out and ensuring a hermeticity of the bladder by a high-temperature mastic;
    placing the bladder under the vacuum, connecting an electric power supply unit to the woven metal wire cloth, and applying different values of current according to a predetermined cycle; and
    removing the third film of heat-resistant polyimide serving as a vacuum enclosure and dismounting the stack.

18. The method as claimed in claim 17, further comprising the steps of applying a current of 15.6 amps to the woven metal wire cloth for 200 seconds, and then applying a current of 10 amps to the woven metal wire cloth for 100 seconds.

19. A method for producing a welded structural joint between a thermoplastic matrix of a composite material of a tank and an elastomer element provided between said tank and a shroud, comprising the steps of:
    functionalizing an elastomeric material using a nonwoven textile formed from thermoplastic material fibers configured to be welded with the thermoplastic matrix of said composite material, functionalization is carried out by penetration of the non-woven textile into a surface layer of the elastomeric material during vulcanization of the elastomeric material under pressure to provide a functionalized layer of the elastomeric material; and
    welding the thermoplastic matrix of said composite material to the functionalized layer of the elastomeric material.

20. The method as claimed in claim 19, wherein the step of welding comprises the steps of heating faying surfaces of two materials to be welded by interposing a woven metal wire cloth between the faying surfaces of the two materials, the woven metal wire cloth functions as a heating resistance and the woven metal wire cloth is impregnated with a thermoplastic material.

21. The method as claimed in claim 20, further comprising the step of preparing the faying surfaces of the two materials to be assembled prior to the step of welding.

22. The method of claim 21, wherein the step of preparing comprises the steps of degreasing using a solvent and cleaning the faying surfaces of the two materials with the solvent.

23. The method of claim 21, wherein the step of preparing comprises the steps of grinding a surface of the functionalized layer of the elastomeric material forming the elastomer and cleaning the surface of the functionalized layer with a solvent.

24. The method as claimed in claim 19, wherein the thermoplastic composite material is a carbon/polyetheretherketone composite; wherein the elastomeric material is of a hydrogenated nitrile butadiene rubber type; and wherein the step of functionalizing the elastomeric material comprises the steps of:
    setting up following elements on a bottom plate of a vulcanizing mold and covering the elements with a top plate of the vulcanizing mold to provide a stack:
        a first set of two superposed layers of Teflon-coated glass cloth;
        a sheet of nonwoven textile composed of polyetherimide fibers;
        sheets of unvulcanized raw elastomeric material;
        a set of edging blocks; and
        a second set of two superposed layers of Teflon-coated glass cloth; and
    placing the stack on plate of a heating press preheated to a temperature $\theta_2$ of 140° C.;
    hot pressing the stack by applying a nominal pressing cycle of the elastomer in question is applied;
    removing the vulcanizing mold from the heating press which maintains the temperature $\theta_2$ of 140° C.; and
    removing the functionalized layer of elastomeric material from the vulcanizing mold to cool to a room temperature.

25. The method as claimed in claim 24, wherein the nominal pressing cycle comprises:
    a phase of gradual increase in temperature to a high temperature $\theta_1$ of 230° C. at a gradient of 2.5° C./min;
    a phase of maintaining the temperature $\theta_1$ for 10 minutes; and
    a phase of temperature decrease to the temperature $\theta_2$ of 140° C. at a gradient of 2.5° C./min.

26. The method as claimed in claim 19, wherein the thermoplastic composite material is a carbon/polyetheretherketone composite; wherein the elastomeric material is of a hydrogenated nitrile butadiene rubber type, and wherein the step of welding comprises the steps of:
　setting up and arranging following elements in order on a plate of heat-insulating material to provide a stack:
　a first film of heat-resistant polyimide;
　the functionalized layer of elastomeric material;
　a first film of polyetherimide;
　a woven metal wire cloth pre-impregnated with polyetherimide;
　a second film of polyetherimide;
　the thermoplastic composite material;
　a second film of heat-resistant polyimide;
　a layer of heat-insulating material; and
　a glass cloth;
　producing a bladder under a vacuum with a third film of heat-resistant polyimide arranged to allow the woven metal wire cloth to stand out and ensuring a hermeticity of the bladder by a high-temperature mastic;
　placing the bladder under the vacuum, connecting an electric power supply unit to the woven metal wire cloth, and applying different values of current according to a predetermined cycle; and
　removing the third film of heat-resistant polyimide serving as a vacuum enclosure and dismounting the stack.

27. The method as claimed in claim 26, further comprising the steps of applying a current of 15.6 amps to the woven metal wire cloth for 200 seconds, and then applying a current of 10 amps to the woven metal wire cloth for 100 seconds.

28. The method as claimed in claim 19, wherein the step of functionalizing comprises the steps of:
　cleaning various parts of a vulcanizing mold;
　applying the nonwoven textile on a surface of the elastomeric material; and
　vulcanizing the elastomeric material under a pressure so that the nonwoven textile placed at a surface of the elastomer material becomes incorporated therein, at least at the surface, during the vulcanization process.

29. The method as claimed in claim 19, further comprising the steps of producing the nonwoven textile by:
　carding thermoplastic material monofilaments;
　producing webs superposed on one another and held together by needle-punching; and
　reinforcing the nonwoven textile by hydro-entangling.

30. The method as claimed in claim 19, further comprising the step of producing the nonwoven textile from a thermoplastic material that is both weldable to a thermoplastic material forming said composite material and compatible with the elastomeric material.

31. The method as claimed in claim 19, further comprising the step of producing the nonwoven textile from a thermoplastic material identical to the thermoplastic material forming said composite material.

32. The method as claimed in claim 19, wherein said composite material is a carbon/polyetheretherketone composite; wherein the elastomeric material is of a hydrogenated nitrile butadiene rubber type; and wherein the nonwoven textile is formed from polyetherimide fibers.

* * * * *